B. BURKETT.
SAFETY VALVE FOR PNEUMATIC TIRES.
APPLICATION FILED JAN. 18, 1911.
1,004,986.
Patented Oct. 3, 1911.
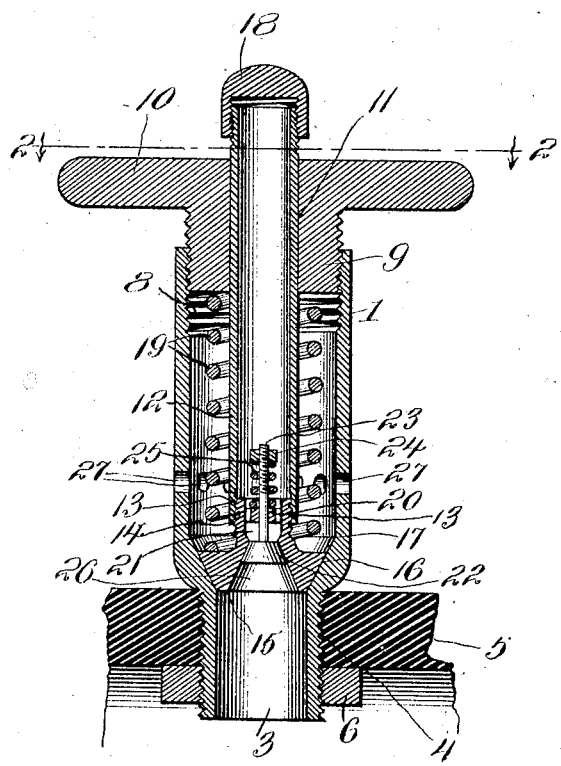
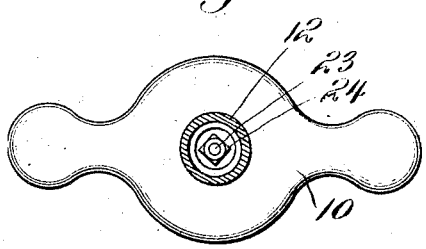
Witnesses
Inventor
Bruce Burkett,
By Victor J. Evans,
Attorney

UNITED STATES PATENT OFFICE.

BRUCE BURKETT, OF BURKETT, TEXAS.

SAFETY-VALVE FOR PNEUMATIC TIRES.

1,004,986. Specification of Letters Patent. Patented Oct. 3, 1911.

Application filed January 18, 1911. Serial No. 603,326.

*To all whom it may concern:*

Be it known that I, BRUCE BURKETT, a citizen of the United States of America, residing at Burkett, in the county of Coleman and State of Texas, have invented new and useful Improvements in Safety-Valves for Pneumatic Tires, of which the following is a specification.

This invention relates to safety valves for pneumatic tires or the like, and has for an object to provide a valve which will prevent explosion of the tire from excessive air pressure.

A still further object of the invention is to provide a valve structure which can be conveniently applied to any well known form of pneumatic tire in lieu of the present check valve.

In the drawing, forming a portion of this specification and in which like numerals of reference indicate similar parts in the several views:—Figure 1 is a vertical section through my improved valve showing the same applied to a portion of an automobile tire. Fig. 2 is a section taken on the line 2—2 of Fig. 1.

My improved valve comprises a casing 1 which is preferably provided with an inner reduced portion 3 adapted to be extended through the passage 4 in the tire 5. The portion 3 is exteriorly threaded and it has mounted thereon the clamping nut 6 which is designed to be adjusted on the portion 3 so as to cause the tire to be securely clamped between the nut and the shoulder 7 of the casing. The opposite end of the casing is provided with an interiorly threaded portion 8 which receives the exteriorly threaded plug portion 9 of the winged adjusting nut 10.

The nut 10 is provided with a longitudinal passage 11 in which is slidably fitted a hollow valve stem 12. The stem 12 is interiorly threaded at its inner end, as at 13, to receive the correspondingly threaded portion 14 of the outwardly opening valve 15. The valve 15 is provided preferably, with a circular flared valve face 16 which is designed to be frictionally engaged with the correspondingly formed seat 17 at the inner end of the valve casing 1. The opposite end of the stem 12 is exteriorly threaded and it has removably fitted thereto a cap 18. The valve 15 is held yielding against the seat 17 by means of a relatively strong helical extensile spring 19 which is interposed between the plug portion 9 of the nut and the valve 15, as shown.

The portion 14 of the valve 15 is provided with a spider 20 in which the stem 21 of an inwardly opening valve 22 is slidably mounted. The outer end of this stem is threaded, at 23, and it has adjustably fitted thereto a nut 24. A relatively light extensile spring 25 is interposed between the nut 24 and the spider 20 and it operates to hold the flared face of the valve 22 against the walls of the seat 26. The seat 26 is constructed by forming a continuous flared passage throughout the valve 15.

Outwardly of the valve seat 17, the casing 1 is provided with escape passages 27. The main body portion of the casing 1 is of a diameter slightly in excess of the diameter of the valve 15 so that when the latter is moved away from the seat 17 the flared face of the valve will be spaced from the walls of the casing so as to permit of the desired discharge of the air.

On inflating the tire the cap 18 is removed and the usual air pump is applied to the outer end of the stem 12, it being understood that the valve 22 will open under pressure of the incoming air created by the pump and will close on outward pressure of the air within the tire. On excessive pressure of air in the tire the valve 15 will be lifted from its seat and the air will be permitted to escape by way of the passages 27. The nut 24 on the stem of the valve 22 can be adjusted so as to obtain any desired tension on the spring 25. The nut 10 can be correspondingly adjusted to obtain any desired pressure on the spring 19.

From the construction of the valve 15 it will be seen that it can be conveniently engaged with or detached from the stem 12 so as to permit the same to be ground. The construction is such that on removal of the valve 15 the valve 22 will be carried therewith and it may also be readily exposed and ground.

I claim:—

In a valve structure of the class described, a casing, a valve seat therein at one end, an adjustable member engaged with the casing at the opposite end, a hollow stem extending through the casing and movable in the adjustable member and having an outer portion extending beyond the adjustable member, a cap removably engaged with the outer portion of the stem, the inner portion of the stem being interiorly threaded, an upwardly projecting exteriorly threaded portion formed integral with the said valve and threaded into the said stem, a spider formed integral with and interior of said upwardly projecting portion, a valve carried by the spider, a spring located in the casing and adjustable between the adjustable member and the valve and operating to normally hold the valve closed against the said seat, said valve having a central valve seat therein, an inwardly opening valve movable in the first valve, a stem carried by the second valve and extending through the spider, a nut adjustable on the second stem, and a spring interposed between the spider and the nut and operating to hold the second valve normally closed against the seat in the first valve, the said casing having a portion immediately adjacent the valve seat of a diameter greater than the diameter of the first valve and formed with a passage.

In testimony whereof I affix my signature in presence of two witnesses.

BRUCE BURKETT

Witnesses:
 STEPHEN HOLMANS,
 E. L. HARRIS.